(12) United States Patent
Keegan et al.

(10) Patent No.: US 10,772,294 B2
(45) Date of Patent: Sep. 15, 2020

(54) NON-TOXIC ELECTRONIC TAG FOR AUDIO PLAYBACK

(71) Applicant: Julia Keegan, Port Angeles, WA (US)

(72) Inventors: Julia Keegan, Port Angeles, WA (US); Vas Obeyesekere, Seattle, WA (US); Bob Carrasca, Seattle, WA (US)

( * ) Notice: Subject to any disclaimer, the term of this patent is extended or adjusted under 35 U.S.C. 154(b) by 0 days.

(21) Appl. No.: 16/028,379

(22) Filed: Jul. 5, 2018

(65) Prior Publication Data

US 2019/0008118 A1    Jan. 10, 2019

Related U.S. Application Data

(63) Continuation of application No. 62/528,956, filed on Jul. 5, 2017.

(51) Int. Cl.
*A01K 11/00* (2006.01)
*A01K 27/00* (2006.01)

(52) U.S. Cl.
CPC .......... *A01K 11/006* (2013.01); *A01K 27/009* (2013.01)

(58) Field of Classification Search
CPC .... A01K 11/006; A01K 27/009; A44C 3/001; G09F 3/207
See application file for complete search history.

(56) References Cited

U.S. PATENT DOCUMENTS

| | | | | |
|---|---|---|---|---|
| 6,003,473 A | * | 12/1999 | Printz | A01K 27/009 119/719 |
| 6,028,752 A | * | 2/2000 | Chomette | G11C 7/16 360/137 |
| 2009/0243791 A1 | * | 10/2009 | Partin | G07C 9/00944 340/5.2 |
| 2012/0236690 A1 | * | 9/2012 | Rader | A01K 27/006 368/10 |
| 2015/0356393 A1 | * | 12/2015 | Daoura | G06Q 10/00 340/8.1 |
| 2016/0366857 A1 | * | 12/2016 | Polk | A01K 27/009 |
| 2016/0378142 A1 | * | 12/2016 | Cardinali | G06F 1/1656 361/679.56 |

\* cited by examiner

*Primary Examiner* — Cassandra Davis
(74) *Attorney, Agent, or Firm* — Christopher Mayle; John D. Houvener; Bold IP, PLLC

(57) ABSTRACT

An electronic tag having an integrated audio playback system for the identification of a pet whereby an audio message can be recorded, stored, and played back. The electronics tag defines a waterproof and shockproof case that is designed to be safely consumed by animals if accidently swallowed. The electronic tag comprises a microphone, a circuit board, power source, battery status indicator, waterproof membrane, and speaker. The circuit board is configured to, upon various engagements of a recording switch and play switch, enter a record mode or enter a playback mode, thereby enabling the owner to record desired audio message on the electronic tag, which subsequently then may be played back to another person in the event the pet is lost.

13 Claims, 3 Drawing Sheets

NON-TOXIC ELECTRONIC TAG FOR AUDIO PLAYBACK

CROSS-REFERENCE TO RELATED APPLICATIONS

This application claims priority to U.S. Provisional Application 62/528,956 filed on Jul. 5, 2017. The content of the above application is hereby expressly incorporated by reference herein in its entirety.

FIELD OF DISCLOSURE

The overall field of the invention is animal husbandry. In particular, the embodiments are directed to an electronic tag or collar that includes an audible message recording and playback system that is safe for accidental consumption.

BACKGROUND

Pet ownership and care is one of the many joys that can be had throughout our lives. Pets not only provide a mutual companionship but also loyalty and security for their owners. Having a pet has many benefits on the owner's wellbeing. Pets can decrease depression, stress, and anxiety, lower blood pressure, improve the immune system, and decrease the risk of heart attack and stroke. Pets demonstrate a vast amount of intellectual capacity, having the ability to recognize emotions, adapt, work, and show obedience. Despite this, pets will sometimes wander away or become misplaced by the owner and then cannot find their way home.

Currently pets are equipped with identification electronic tags or collars but with the passage of time, the collars may slip off and the writing may become ineligible. The installation of implantable microchips into pets is another popular method for improving the recovery of lost pets. If the pet becomes lost, the pet may then be taken to a vet clinic or animal shelter, where the pet will be scanned using RFID technology to transmit a unique ID number associated with the owner's contact information on file. Pets with microchips have been shown to have a greater chance of reuniting with their owners than the pets without the microchip. However, there are problems with this method. Not all scanners and microchips operate on the same frequency, leaving the scanner unable to identify the unique ID number. Universal scanners have been introduced but there are still scanners out there with this problem. Microchip implanting has also led to complications with the pet, including hemorrhaging, tumors, and the microchip moving inside of the body causing infections and abscesses.

Another method of identification is the use of pet collars with an integrated audio playback system, which may be activated by person who finds a lost pet. The audio message is a recorded customized message available for playback that can be selectively recorded by users so that playback could help another person ascertain identification information concerning the animal. These devices though are very complex, lack durability, and may cause gastro-intestinal damage to a dog, cat, or other companion animal, if accidentally consumed.

SUMMARY

Embodiments in the present description are directed to an electronic tag having an integrated audio playback system, comprising: a housing defining a first internal volume there within, wherein the housing is comprised of a material safe for animal consumption, a circuit board within the housing including a signal input module, an analog-to-digital conversion module, a memory storage module, an amplifier module, and a signal output module, wherein the circuit board is configured to perform recording and playback operations with respect to electrical signals received and transmitted, a microphone connected to the circuit board configured to receive and process sound into electrical signals, a speaker connected to the circuit board configured to receive and process electric signals into sound and a power source coupled to the circuit board configured to supply electrical power to the circuit board.

It is an object of the present description to provide a method of using an electronic tag having an integrated audio playback system, comprising, providing an electronic tag, the electronic tag having a housing defining a first internal volume there within, the housing comprised of a material safe for consumption, a circuit board within the housing including a signal input module, an analog-to-digital conversion module, a memory storage module, an amplifier module, and a signal output module, wherein the circuit board is configured to perform recording and playback operations with respect to electrical signals received and transmitted, a microphone connected to the circuit board, wherein the microphone is configured to receive and process sound into electrical signals, a speaker connected to the circuit board, wherein the speaker is configured to receive and process electric signals into sound; and a power source coupled to the circuit board, wherein the power source is configured to supply electrical power to the circuit board.

BRIEF DESCRIPTION OF DRAWINGS

The present invention will be described by way of exemplary embodiments, but not limitations, illustrated in the accompanying drawings in which like references denote similar elements, and in which.

DEFINITION

Figure 1:
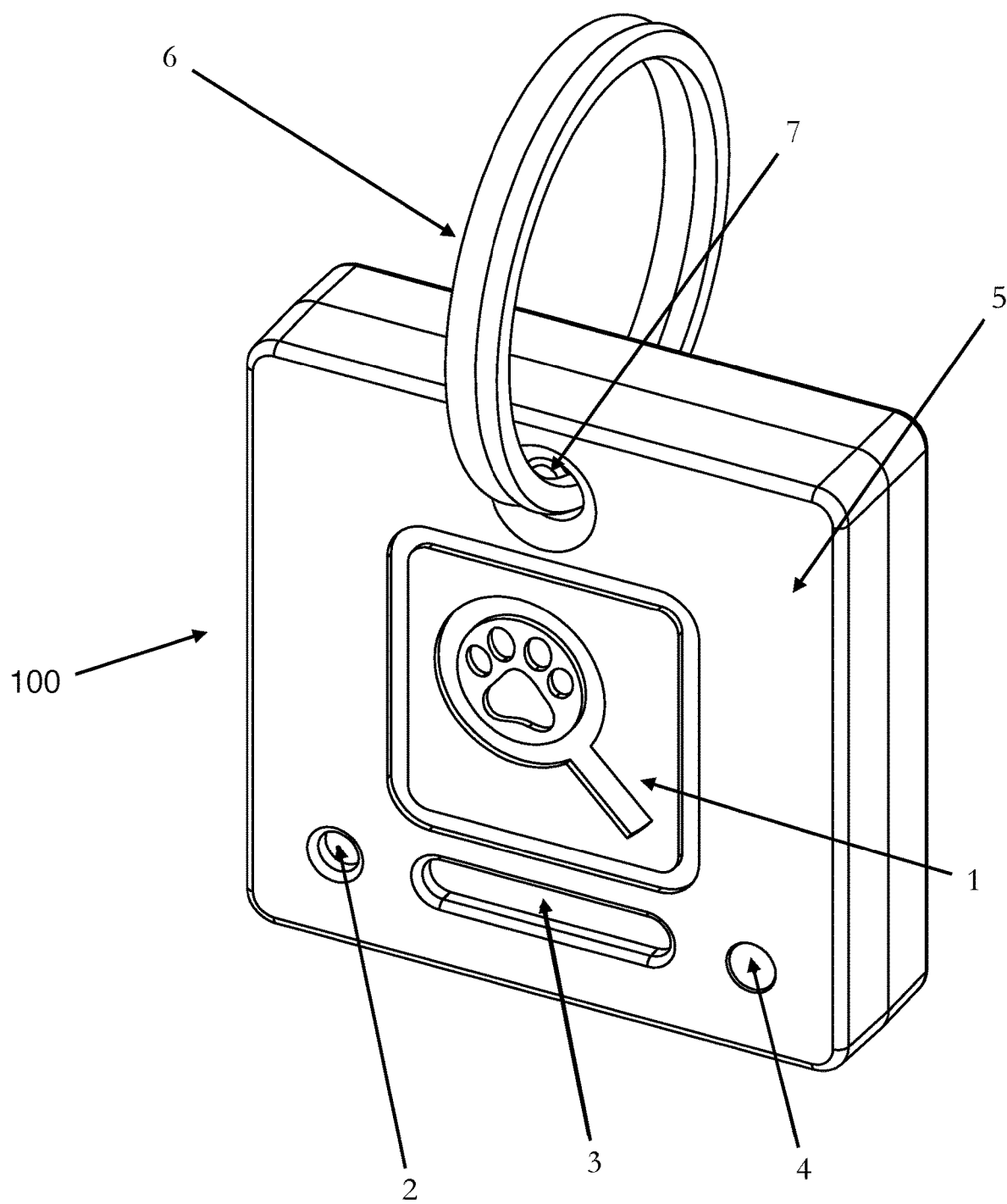
FIG. 1 depicts an isometric view of the electronic tag.

Non-toxic" is herein defined as containing no elements that, as of January 2011, have been identified as toxic to companion animals, including cats and dogs, by the US Pet Poison Control Association. Materials utilized may include, but are not limited to plastics such as, acrylic, polyethylene terephthalate (PET), polyvinyl chloride (PVC), polypropylene (PP), ABS plastics, Nylon, polybutylene terephthalate (PBT), polyethylene, such as High Density Polyethylene (HDPE), High Impact Polypropylene (HIPP), polycarbonate, polystyrene such as high impact polystyrene (HIP), thermoplastic olefins (TPO's), polyesters, polyurethanes (PU), polyamides, multipolymer compounds, composites, any material known in the art, and/or combinations thereof.

DETAILED DESCRIPTION

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

The present disclosure recognizes the unsolved need for a companion electronic tag with audio playback for identification having an integrated audio playback system that allows the playback of a recorded message directly from the collar of a pet by any person who came in contact with the pet. The electronic tag may be built into a collar, wristband, or anklet or attached to the collar, wristband, or anklet for further accessibility and protection. The electronic tag is waterproof, shockproof, and impact resistant, to ensure the message can still be played after threatening conditions and has a "non toxic" housing that can safely be consumed by the pet or another animal without damaging their gastro intestinal tract.

Referring to the FIG. 1, an isometric view of the electronic tag 100 is shown. Electronic tag 100 may include a front half enclosure such as front half enclosure 5 having a play button such as play button 1, a microphone opening such as microphone opening 2, a speaker opening such as speaker opening 3, and a LED status opening such as LED status 4. Front half enclosure 5 is made of a "non toxic" material whereby front half enclosure is preferably made out of nylon but may also manufactured from plastic in an injection molding process though other materials or methods such as casting or stamping may be used. Play button 1 may be depressed by an individual such as the owner or another person who is attempting to identify the missing pet to play a recorded message. Play button 1 may have a seal around play button 1 or the seal may already be constructed into play button 1 to prevent water or other material from inflowing into electronic tag 100 between front half enclosure 5 and play button 1.

Play button 1 may be labeled with a description so that a person such as the owner or another person who is attempting to identify the missing pet may have instructional information on how to use electronic tag 100. In one or more non-limiting embodiments, the instructional information may be located on a different location of the electronic tag. Speaker opening 3 allows for the passage of sound from within electronic tag 100 to enable a person in proximity to listen to the playback of a recorded message. Microphone opening 2 allows for the passage of sound into electronic tag 100 to enable a person in proximity to record a message.

LED status indicator opening 4 allows the viewing of light emitting from an LED status indicator such as LED status indicator 11. LED status indicator 11 notifies the owner that something has changed with the mechanics of electronic tag 100. This change may be a low battery indicator to signal to the owner that the life of an internal battery such as internal battery 15 has reached a level of capacity lower than a certain threshold. LED status indicator 11 may be a light emitting diode that flashes periodically or emits a continuous light when there is a change in the status of electronic tag 100. At the top of front half enclosure 5 is a hole such as hole 7 through which a ring such as ring 6 may be positioned.

Ring 6 supports electronic tag 100 when attached to a collar enabling electronic tag 100 to move through one or more coordinate planes when worn by a pet. Ring 6 may be a split ring, a solid ring, a cable, or a tube. Additionally, ring 6 may be comprised of any shape as long as it functions to support electronic tag 100 when attached to another item. Ring 6 may include shapes such as a triangle, square, and pentagon. Ring 6 may be comprised of any material that supports electronic tag 100 and can withstand environmental factors, such as moisture, heat, and ultraviolet (UV) rays. Ring 6 may be comprised of metal, plastic, silicone, and wood.

Figure 2:
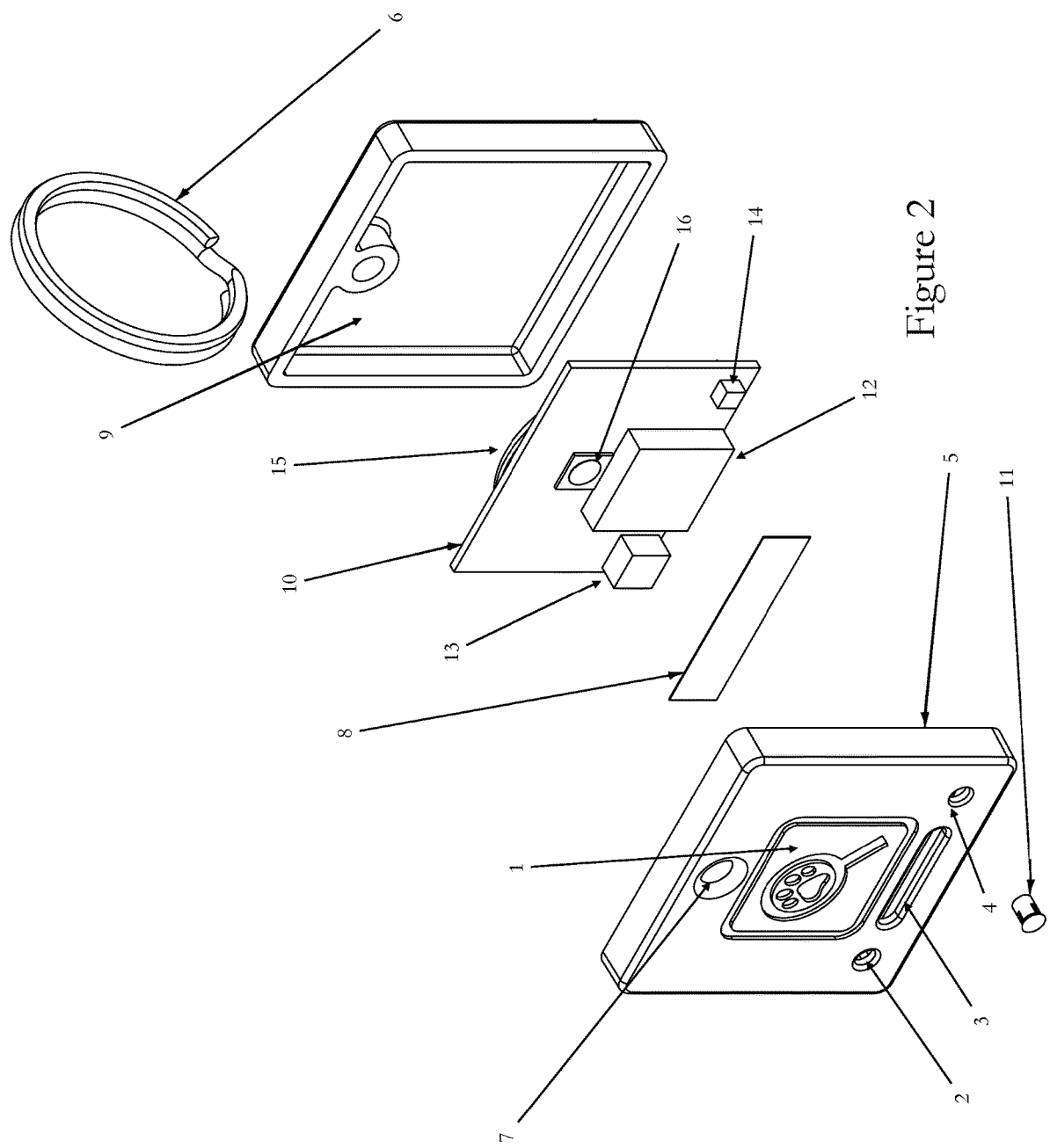
FIG. 2 depicts an exploded view of the electronic tag.

FIG. 2 depicts an exploded view of the electronic tag. Electronic tag 100 may include rear half enclosure such as rear half enclosure 9, identical size and similar nature to front half enclosure 5. Rear half enclosure 9 may be connected to front half enclosure 5 by ultrasonic welding but in other non-limiting embodiments enclosures 5 and 9 may be connected by other means that do not compromise the integrity of electronic tag 100 and do not depart from the intended functionality. In one or more non-limiting embodiments, rear half enclosure 9 may have indicia or other visual element(s) that can convey information that may be engraved upon rear half enclosure 9 or have a physical ID electronic tag placed on rear half enclosure 9 to provide other means of identification for the pet. Located on rear half enclosure 9 may be a recessed recording button. In one or more non-limiting embodiments the recessed recording button may be on front half enclosure 5.

The recessed recording button may have seal around the recording button or the seal may already be constructed into the recording button to prevent water or other material from inflowing into the electronic tag between the housing and the recessed recording button. The recessed recording button may be depressed by a straightened paper clip, pushpin, or other apparatus with similar features. The recording button is designed to be easily accessible with an instrument for when the owner and pet travel to a temporary new location or the pet is being cared for by another person but is recessed enough wherein a person cannot accidently depress the button to erase and record a new message. After the recording button is depressed and then released, an internal circuit board such as circuit board 10 will record a message. The length of the message may be a maximum of 60 seconds, but the maximum length may vary based on the size of the internal storage. This will give enough time for the owner to record their name, contact information, and any desired information concerning the pet such as allergies or warnings on the electronic tag such that if the pet is ever located by another person the person can directly and quickly receive this information to facilitate the return of the pet.

A speaker such as speaker 12 is located behind speaker opening 3 to allow for passage of sound. Speaker 12 is designed for weatherproofing if electronic tag 100 becomes wet. One or more batteries such as batteries 15 are located on circuit board 10. Batteries 15 are preferably button cell batteries, but in other non-limiting embodiments may be other types of batteries. A digital recording and playback circuit is also located on the circuit board 10. The parts chosen for the electronic tag are selected for their waterproof properties but also a membrane such as membrane 8 may be attached to the inside of front half enclosure 5. Membrane 8 is preferably made out of stretched polytetrafluoroethylene or another suitable material. Membrane 8 forms a waterproof barrier around the inside components and prevents water ingress through speaker 12, and a microphone such as microphone 13. Speaker 12 and microphone 13 may have a pass-through area in membrane 8 to allow them to remain operational without affecting the integrity of the waterproof seal. In one or more non-limiting embodiments, speaker 12 and microphone 13 may be bonded to membrane 8 through the use of adhesives to allow the sound to pass through without being impeded.

Batteries 15 may be connected to a power supply on circuit board 10. Batteries 15 may also be connected to a voltage regulator such as voltage regulator 14. Based on internal reference voltage, voltage regulator 14 may determine when the battery life is lower than a designated threshold. When this occurs, voltage regulator 14 may begin to send a voltage pulse to LED status indicator 11 causing LED status indicator 11 to emit a light periodically that may be seen through the LED status indicator opening 4 on the front half enclosure 5. In other embodiments, the voltage regulator 14 may send a voltage charge to LED status indicator 11 to emit a light continuously. LED status indicator 11 provides the owner or other person with a notification that the batteries in electronic tag 100 will soon fail. Play button 1 and recessed recording button are connected to a play switch such as play switch 16 and a recording switch respectively, located on circuit board 10. Circuit board 10 allows for the recording or uploading of an audio message to a memory component on circuit board 10 when the recessed recording button is depressed and recording switch is activated. Circuit board 10 allows for the playback of previously recorded digital signals stored in the memory component of circuit board 10 through an amplifier and recording component of circuit board 10 and subsequently to speaker 12.

When play button 1 is depressed and the recording switch is activated on circuit board 10 the message may be played through speaker 12. Circuit board 10 may contain timer circuitry wherein when play button 1 or recessed recording button is depressed and the play switch or recording switch is activated; a cycle of a certain amount of seconds begins. Preferably this is 60 seconds but may be adjusted. Play button 1 or recessed recording buttons are not required to be continuously depressed during the playback or recording cycle. Circuit board 10 may have an analog/digital conversion component wherein the component provides the necessary conversion between the memory component and the analog amplifier and recording circuit and may operate in both directions. Circuit board 10 may also have the necessary circuitry to amplify and convert the signal to speaker 12 and to convert the signal from microphone 13 to circuit board 10. In one or more non-limiting embodiments speaker 12 may operate as both speaker 12 and microphone 13.

In one or more non-limiting embodiments, electronic tag 100 may have rechargeable internal batteries and use inductive charging to recharge the batteries. This may be done by magnetic coupling between electronic tag 100 and a charger or dock, wherein this coupling may provide direct current by a receiver circuit inside the electronic tag to recharge the internal battery without opening enclosures 5 and 9. In one or more non-limiting embodiments, electronic tag 100 may contain one or more electromagnets inside of electronic tag 100. The charger or dock for charging may also contain an electromagnet and/or a permanent magnet. Electronic tag 100 may turn on its electromagnet when it is close to the charger or dock.

Electronic tag 100 may detect proximity to the dock or charger by looking for the magnetic field signature of a permanent magnet in the charger or dock using a magnetometer. Alternatively, electronic tag 100 may detect proximity to the charger by measuring the Received Signal Strength Indication (RSSI) of a wireless signal from the charger or dock by recognizing an NFC or RFID electronic tag associated with the charger or dock. The electromagnet could be reversed, creating a force that repels electronic tag 100 from the charging cable or dock either when the electronic tag doesn't need to be charged, synced, or when it has completed syncing or charging.

In one or more non-limiting embodiments, the charger or dock may include the electromagnet and may be configured (e.g., a processor in the charger or dock may be configured via program instructions) to turn the electromagnet on when electronic tag 100 is connected for charging (the electromagnet may normally be left on such that electronic tag 100 that is placed on the charger is drawn against the charger by the electromagnet, or the electromagnet may be left off until the charger determines that electronic tag 100 has been placed on the charger, e.g., through completion of a charging circuit, recognition of an NFC, etc., and then turned on to draw electronic tag 100 against the charger. Upon completion of charging (or of data transfer, if the charger is a data transfer cradle or a combined charger/data transfer cradle), the electromagnet may be turned off (either temporarily or until electronic tag 100 is again detected as being placed on the charger) and electronic tag 100 may stop being drawn against the charger. In such embodiments, it may be desirable to orient the interface between the electronic tag and the charger such that, in the absence of a magnetic force generated by the electromagnet, electronic tag 100 would fall off of the charger or otherwise shift into a visibly different position from the charging position (to visually indicate to a user that charging or data transfer is complete).

In one or more non-limiting embodiments, play button 1 may also double as the recording button wherein record mode may be initiated by depressing play button for a predetermined amount of seconds, such as a period of time greater than three seconds. In further non-limiting embodiments, the electronic tag may be anchored and adhered to the body of a pet collar. In even further non-limiting embodiments, electronic tag 100 may be attached and adhered to the body of a wristband or anklet or built into a wristband or anklet. In further non-limiting embodiments, a bittering agent such as Denatonium Benzoate may be applied to the electronic tag.

Figure 3:
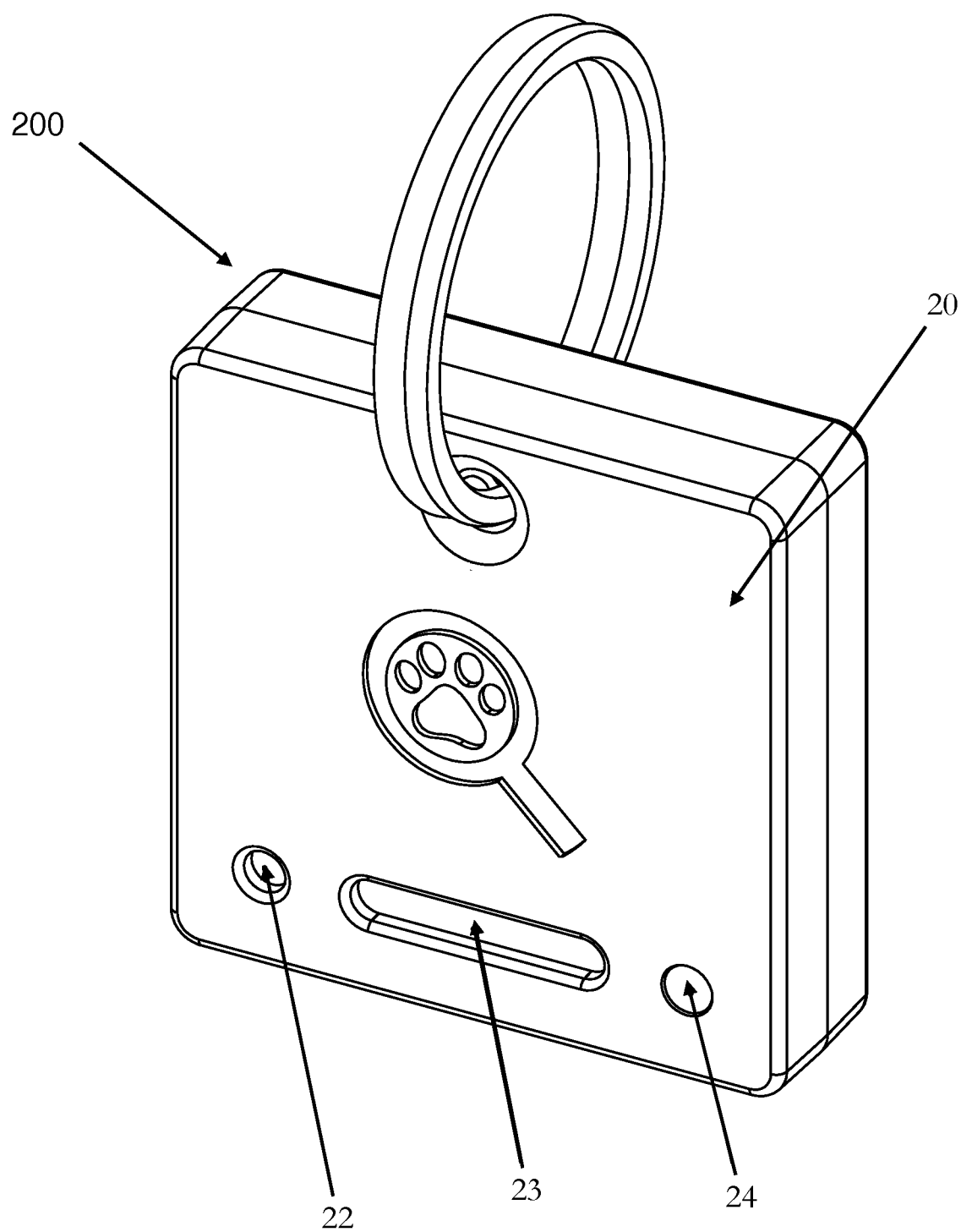
FIG. 3 depicts an isometric view of the electronic tag with a squeezable housing.

FIG. 3 depicts electronic tag 200 as another embodiment of the present invention. In one or more non-limiting embodiments such as electronic tag 200, Play button 1 may be replaced by flexible housing such as flexible housing 20 that may be formed of a deformable material such as plastic, thin glass, fiber composites, thin metals, fabric, silicone, other suitable materials, or a combination of these materials. Flexible housing 20 may be formed from a conformal mold such as soft deformable plastic, silicone or other deformable material that bonds to internal components such as the circuit board, batteries, speaker, and microphone that conforms to fill available volume in electronic tag 200 and be attached to internal components or a display using fasteners, hinges, latches, or other methods. Flexible housing 20 may include engagement features for attaching other flexible or rigid components of electronic tag. Flexible housing 20 may be formed from a single flexible component formed from a deformable material or may include multiple components formed from a deformable material. Play switch may be arranged so that a squeeze of flexible housing 20, that deforms flexible housing 20, activates play switch by moving a portion of flexible housing 20 into contact with the switch. Electronic tag 200 may also have a speaker opening such as speaker opening 23 that allows for the passage of sound from within electronic tag 200 to enable a person in proximity to listen to the playback of a recorded message, a microphone opening such as microphone opening 22 that allows for the passage of sound into electronic tag 200 to enable a person in proximity to record a message and a LED status indicator opening such as LED status indicator opening 24 allows the viewing of light emitting from an LED status indicator.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. An electronic tag having an integrated audio playback system, comprising:
    a housing defining a first internal volume there within, a bittering agent applied to the housing;
    a circuit board within the housing wherein the circuit board is configured to perform recording and playback operations with respect to electrical signals received and transmitted;
    a microphone connected to the circuit board configured to receive and process sound into electrical signals;
    a speaker connected to the circuit board configured to receive and process electric signals into sound;
    a power source coupled to the circuit board configured to supply electrical power to the circuit board; and
    a stretched polytetrafluoroethylene membrane connected to an inside surface of the front half enclosure, the membrane configured to operate as a waterproof barrier, the speaker and microphone the microphone bonded to the membrane, the membrane having a pass through area, the pass through area configured to permit the speaker and the microphone to remain operational without affecting the integrity of the waterproof barrier.

2. The electronic tag of claim 1, wherein the circuit board is configured for recording and playing back a message of at least 60 seconds in duration.

3. The electronic tag of claim 1, wherein the housing is comprised of a nylon material.

4. The electronic tag of claim 1, wherein the housing is comprised of a front half enclosure and a rear half enclosure, the rear half enclosure connected to the front half enclosure to provide an internal volume.

5. The electronic tag of claim 1, further comprising a ring, wherein an aperture passing through the front half enclosure and rear half enclosure is configured to receive the ring.

6. The electronic tag of claim 5, wherein the ring is configured to be connected to a leash.

7. The electronic tag of claim 1, wherein the power source is one or more rechargeable internal batteries capable of inductive charging to recharge.

8. The electronic tag of claim 1, further comprising indicia or other visual elements engraved on the housing.

9. The electronic tag of claim 1, further comprising a low battery indicator connected to the circuit board, the low battery indicator including a light emitting diode configured to indicate when the one or more batteries drops below a certain threshold.

10. The electronic tag of claim 1, further comprising a recording switch configured to control recording an audio message stored on the memory storage module and a play switch configured to control playing back the audio message stored on the memory storage module.

11. An electronic tag having an integrated audio playback system, comprising:
    a housing defining a first internal volume there within;
    a circuit board within the housing wherein the circuit board is configured to perform recording and playback operations with respect to electrical signals received and transmitted;
    a microphone connected to the circuit board configured to receive and process sound into electrical signals;
    a speaker connected to the circuit board configured to receive and process electric signals into sound; and
    a power source coupled to the circuit board configured to supply electrical power to the circuit board;
    wherein the housing is formed of a deformable material wherein a play switch is positioned so that a squeeze of the housing that deforms the housing activates play switch by moving a portion of the housing into contact with the play switch.

12. An electronic tag having an integrated audio playback system, comprising:
    a housing defining a first internal volume there within,
    a circuit board within the housing wherein the circuit board is configured to perform recording and playback operations with respect to electrical signals received and transmitted;
    a microphone connected to the circuit board configured to receive and process sound into electrical signals;
    a speaker connected to the circuit board configured to receive and process electric signals into sound;
    a power source coupled to the circuit board configured to supply electrical power to the circuit board;
    a play button configured to control recording an audio message stored on a memory storage module and control playing back the audio message stored on the memory storage module, wherein the circuit board is configured to perform recording wherein record mode is configured to be initiated by depressing the play button for a predetermined amount of seconds; and
    a bittering agent applied to the housing.

13. The electronic tag of claim 12, wherein the predetermined amount of seconds is greater than 3 seconds.

* * * * *